United States Patent [19]
Schoenborn et al.

[11] 3,885,153
[45] May 20, 1975

[54] MULTI-LAYER MONOCHROMATOR

[75] Inventors: Benno P. Schoenborn, Calverton, N.Y.; Donald L. D. Caspar, Brookline, Mass.

[73] Assignee: The United States Energy Research and Development Administration, Washington, D.C.

[22] Filed: June 20, 1974

[21] Appl. No.: 481,421

[52] U.S. Cl. ............... 250/251; 250/390; 250/510
[51] Int. Cl. ............................................ G01t 1/36
[58] Field of Search .......... 250/276, 280, 510, 499, 250/500, 503, 272, 251, 390, 392; 350/162

[56] References Cited
UNITED STATES PATENTS

| | | | |
|---|---|---|---|
| 2,543,630 | 2/1951 | Hansen | 250/510 |
| 2,688,094 | 8/1954 | Dumond | 250/276 |
| 3,397,312 | 8/1968 | Okano | 250/276 |
| 3,517,193 | 6/1970 | Mook et al. | 250/392 |
| 3,576,994 | 5/1971 | Parks | 250/500 |

*Primary Examiner*—Harold A. Dixon
*Attorney, Agent, or Firm*—Dean E. Carlson; C. Daniel Cornish

[57] ABSTRACT

This invention provides an artificial monochromator crystal for efficiently selecting a narrow band of neutron wavelengths from a neutron beam having a Maxwellian wavelength distribution, by providing on a substrate a plurality of germanium layers, and alternate periodic layers of a different metal having tailored thicknesses, shapes, and volumetric and neutron scattering densities.

10 Claims, 9 Drawing Figures

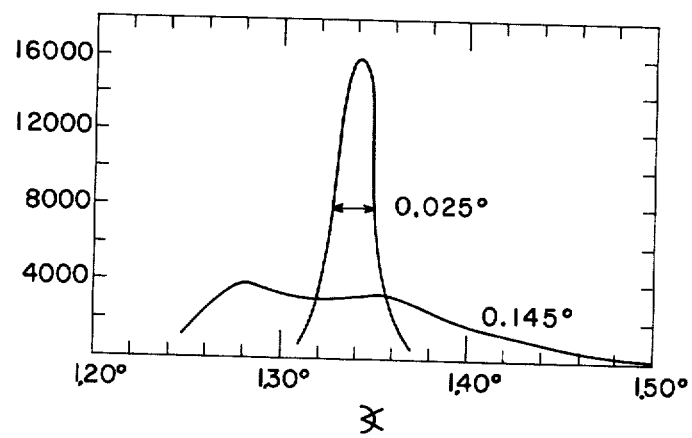
Fig. 5b
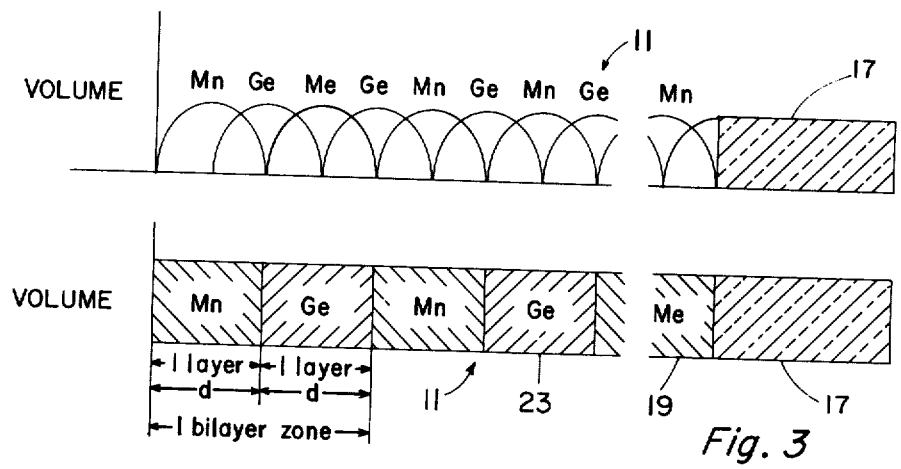
Fig. 3a
Fig. 3
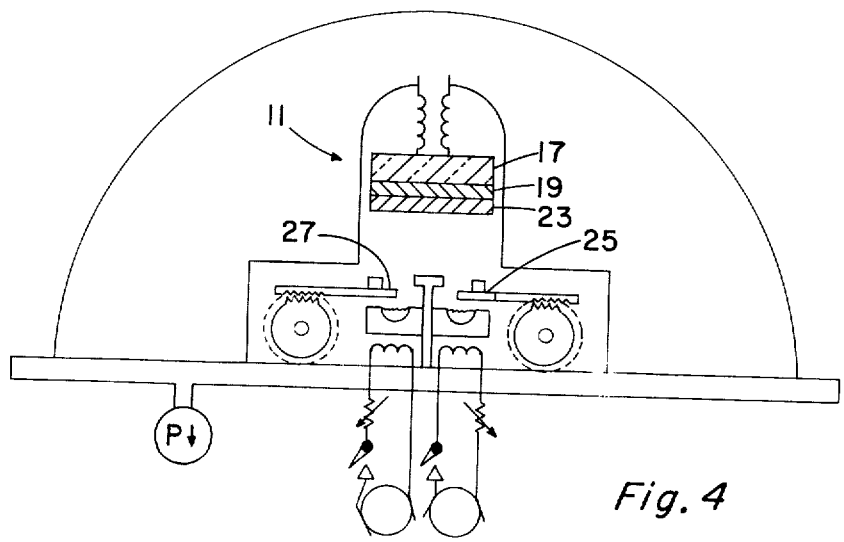
Fig. 4

3,885,153

MULTI-LAYER MONOCHROMATOR

BACKGROUND OF THE INVENTION

This invention was made in the course of, or under a contract with the U.S. Atomic Energy.

In the field of biology it is advantageous to determine the arrangement of atoms in a complex lattice, such as myoglobin, sciatic nerve fibers, and/or membranes composed of double bi-layers of alternating sheets of $D_2O$ and liquids with repeat distances of 360 A. Various single naturally occurring crystal means have been proposed and used for such determinations, such as the single alkalihalide crystals described on page 105 of "Thermal Neutron Scattering" by Peter A. Egelstaff, Acedemic Press, New York, 1965, since they contained nuclei having very small nuclear absorption for neutrons, neglible incoherent scattering, and fairly large coherent scattering cross-section. To increase the reflectivities specific single naturally occurring aluminum, copper or lead metal crystals have been used, and, as described in Ber. Bunseng. Phys. Chem. Band 74, Heff 11, 1970, pp. 1,202–1,207, a single germanium crystal has also been used for selecting monochromatic neutrons. However, the heretofore known crystals have had relatively low input to output beam radiation intensity efficiencies. Also, it has been difficult or impossible to use them for selecting wavelengths of up to about 10 A, since it has been difficult or impossible to control the distance between the nuclei in the scattering crystal. It is additionally advantageous to provide a narrow output beam divergence of less than about two times the input beam divergence, and a selective wavelength spread.

SUMMARY OF THE INVENTION

This invention provides a monochromator and a method for making the same for efficiently selecting a narrow band of neutron wavelengths from a neutron beam having a Maxwellian wavelength distribution of between 0.5 and 20 A, comprising a substrate, a plurality of uniform, selectively-tailored germanium layers on the substrate, and a plurality of selectively-tailored layers between 20 and 200 A thick having different volumetric density and scattering factors from the germanium layers and that alternate periodically with the germanium layers and are parallel therewith.

In one embodiment, this invention provides a monochromator for efficiently selecting a narrow band of neutron wavelenths from an input beam having a Maxwellian wavelength distribution of neutrons, comprising a flat substrate, a plurality of parallel flat, uniform, selectively-tailored thickness, amorphous, germanium layers uniformly deposited over the entire surface of the substrate, and a plurality of amorphous layers that alternate periodically with the germanium layers, are interposed therebetween, and are parallel and equal in thickness therewith selected from the group consisting of tantulum and manganese layers having a selectively tailored thickness. This invention also provides a method for making the same. In another aspect, the layers have a sinusoidally varying volumetric scattering density. In still another aspect, the substrate and layers are bent to form in cross-section a generally elliptically-shaped dish having open and closed ends defined by a convex side for receiving and focusing at a focal point an input beam having a divergence of 2. With the proper selection of elements and steps, as described in more detail hereinafter, the desired monochromator is achieved.

It is an object of this invention, therefore, to provide a monochronomator having high input to output beam efficiencies for selecting a narrow beam of neutron wavelengths from an input beam having a Maxwellian wavelength distribution of neutrons with wavelengths from 0.5 to 20 A, by providing an artifical crystal having a selected number of tailored layers of different volumetric density and scattering factors, and tailored shapes and thickness of between 20–200 A thick.

The above and further novel features and objects of this invention will become apparent from the following detailed description of three embodiments when read in connection with the accompanying drawings, and the novel features will be pointed out in the appended claims.

BRIEF DESCRIPTION OF THE DRAWINGS

In the drawings, where like elements are referenced alike:

FIG. 3 is a detailed view of the layers of FIG. 2 that are produced by one embodiment of the method of this invention;

FIG. 3a is a graphic view of another embodiment of the layers of FIG. 2 that are produced by the operation of another embodiment of the method of this invention;

FIG. 4 is a partial cross-section of the apparatus for making the monochromator of FIG.'s 3 and 3a;

FIG. 5b is a graphic illustration comparing the intensity of the neutrons scattered from the monochromators of FIG.'s 2 and 5.

DESCRIPTION OF THE PREFERRED EMBODIMENTS:

From the Bragg equation $\lambda = 2d \sin \theta$, the wavelength spread $\Delta\lambda$ of the radiation diffracted from a monochromator is obtained by differentiation and for a small scattering angle $\theta$:

$(\Delta\lambda/\lambda) = (\Delta d/d) = + (\Delta\theta/\theta)$

For low angle scattering measurements from specimen unit spacings $d \sim 100$ A it is desirable to minimize $\Delta\theta$ in order to achieve high resolutions and to keep $\Delta\lambda$ relatively large so that $(\Delta\lambda/\lambda) \sim .1$ in order to maximize diffracted intensity. Monochromator diffraction spacings greater than 50 A are required to satisfy these conditions. Heretofore efficient monochromators with large spacings $d(20-300$ A) have not been available, but they can be made in the form of multiple stacked bilayers in accordance with this invention.

This multilayer monochromator of this invention, comprises alternate amorphous layers with a periodicity $d$ of two materials having greatly different scattering factors. The structure factor F for a bi layer is given by $F = (d/\pi n)(b_1 f_1 - b_2 f_2)$ where
$b$ = scattering length and $f$ = density. The scattering factor is, therefore, proportional to the differences between the unit volume scattering length of the two materials used. If the bilayer is composed of two equally thick layers, then the even order reflections will be absent.

Figure 1:
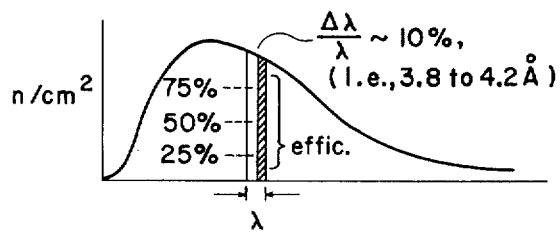
FIG. 1 is a graphic representation of a neutron flux from a conventional neutron source, showing a narrow band of wavelengths that are selected according to the 10 bilayer embodiment of this invention with efficiencies of up to 35 percent or more.

Referring to FIG. 1, this invention provides an artificial tailor-made monochromator crystal that is useful in selecting a narrow band of neutron wavelengths $\lambda$, e.g., from 3.8 to 4.2 A, where the band width $(\Delta\lambda/\lambda) = 10$ percent, with an efficiency of up to 35 percent or more from an input beam having a Maxwellian wavelength distribution of from 0.5 to 20 A, such as produced by the high flux beam reactor described in U.S. Pat. No. 3,143,478. This neutron source is well known in the art as producing a neutron number density flux $n/cm^2/sec$ of $10^7$ neutrons, as determined by conventional detectors, such as those that are understood from the cited references. Also, it will be understood that the crystal of this invention is operable with the computer actuated crystal rotating means described in U.S. Pat. No. 3,435,219. Thus, the monochromator of this invention, which is described in more detail hereinafter, is useful in determining the arrangement of atoms in samples of complex lattices, such as myoglobin, sciatic-nerve fibers, and/or membranes composed of double bi-layers of alternating sheets of water ($H_2O$ and $D_2O$) and lipids with repeat distances of 360 A.

Figure 2A:
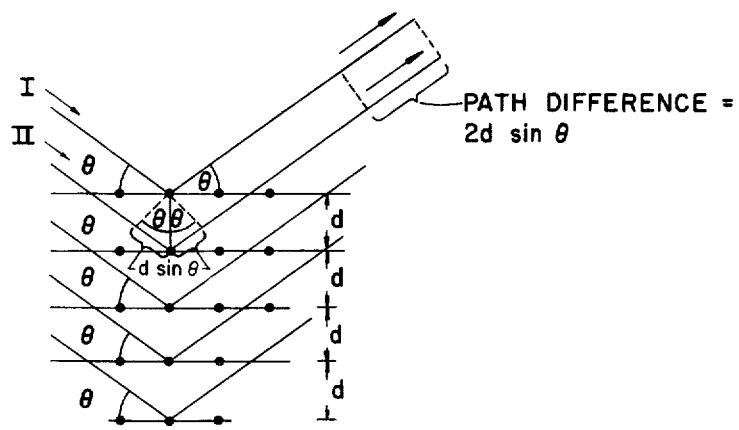
FIG. 2a is a detailed schematic view of neutrons being scattered from the artifical crystal of FIG. 2.
Figure 2:
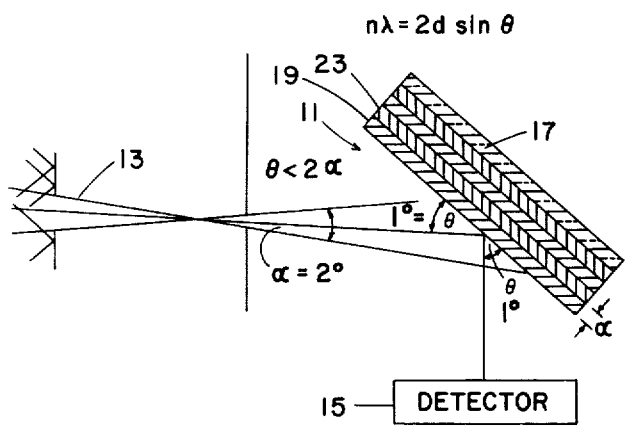
FIG. 2 is a partial cross-section of the monochromator of this invention.

In understanding the artificial monochromator crystal of this invention, it will be understood from FIG. 2 that the neutrons from a suitable source pass through two annular slits to produce a collimated neutron beam 13 having a desired divergence angle $\alpha$ and a scattering angle $\theta$ from a crystal. Ordinarily the beam 13 passes through a beam pipe having a Be filter and two Cd slits in successive stages, and the beam is transmitted for detection and/or calibration by a detector 15, comprising a graphite analyzer and a $He^3$ counter that are so well known in the art that they need not be described in more detail hereinafter. By changing the position of the crystal and/or the sample, which receives and transmits the neutrons scattered from the crystal, and analyzing the neutron pattern detected the arrangement of the atoms in the sample can be determined.

In accordance with the embodiment of this invention shown in FIG. 2, alternating layers of two different metals evaporated on to an optical flat form an artifical one-dimensional crystal 11 that can serve as a wide wavelength pass, narrow angular divergence X-ray or slow neutron monochromator. Based upon measurements of the reflectivity of such metal film multi-layers the monochromator of this invention has the desired advantages over single crystal monochromators and total reflection mirror monochromators.

Referring to FIG.'s 2 and 2a, in accordance with the well known constructive interference formula $n\lambda = 2d \sin\theta$, where $n$ is an integral number of wavelengths for producing parallel "refracted" rays that constructively interfer when the paths differ by exactly $\lambda, 2\lambda, 3\lambda$ and so on, the neutron beam 13 is scattered from the nuclei in the monochromator crystal 11, and the scattering angle $\theta$ of the axis of the beam 13 with the surface of crystal 11 is small for large input to output beam efficiencies, such that the atomic spacing distance $d$ between the crystal nuclei in parallel planes for constructive interference corresponds exactly to the wavelength $\lambda$ of the neutrons that are selected by crystal 11 and detected by the detector 15. Referring to Table I, for example, at a distance $d = 100$ A neutrons having a wavelength $\lambda \sim 4A$ in a beam 13 having a divergence $\alpha \sim 2°$ will be selected with high input to output beam efficiencies by crystal 11 at an angle $\theta \sim 1°$. Here the distance $d$ and the angle $\theta$ are defined as described above, and understood in more detail from page 483 of "Introduction to Physics and Chemistry," 2nd Ed., by Arthur Beiser, McGraw Hill Book Co., 1964. On the other hand, as understood in the art from Table I, a natural crystal would require a scattering angle $\theta \sim 38°$ for selecting neutrons with a wavelength $\lambda = 1A$, and such angles have very low input to output beam efficiencies. Moreover, at wavelengths of 10 A, it is impossible to provide a monochromator made from a single naturally occurring crystal, such as known heretofore.

Crystal 11 is additionally advantageous, since it provides a narrow beam divergence of less than about 2 times the input divergence $\alpha$, and the wavelength band spread $(\Delta\lambda/\lambda)$ can be selected in accordance with the distance $d$ and the incident beam divergence $\alpha$. To this end, the crystal 11 can be tailor made flexibly to select and/or vary any of a wide number of atomic spacing distances $d$ to a wide variety of wavelengths $\lambda$ and scattering angles $\theta$. Also, the shape and volumetric and neutron scattering densities of the crystal 11 can be selected, varied, and/or tailor made, as described in more detail hereinafter, while the crystal nuclei still have large reflectivities, very small nuclear absorption, negligible incoherent scattering, and a large coherent scattering cross-section.

Referring now to FIG. 3, this invention provides an artificial monochromator crystal 11 having the desired advantages by providing specific alternate layers that are selectively applied for controlling the selection distance $d$ for constructive interference. To this end, there is provided on a substrate 17, which is tailored as to shape, a plurality of first amorphous layers 19 having tailored thicknesses, shapes and volumetric and neutron scattering densities; and specific, alternate, periodic amorphous second layers 23 interposed between the first layers and having tailored thicknesses and shapes and specific volumetric and neutron scattering densities that are different from the first layers. In this regard, for controlling and selectively varying the selection distances $d$, the layers 19 and 23 are defined hereinafter as having a periodicity $d$, which equals the thickness of the alternate layers.

The multilayer monochromator advantageously comprises alternate amorphous layers with a periodicity $d$ of two different materials having greatly different scattering factors $b$. As illustrated in Table II, these factors differ by at least 12.1 and they are advantageously alternately positive and negative. Also, the layers selected have widely different volumetric nucleon densities $f$, as determined from the periodic chart of the elements, and understood in the art from the above-cited Egelstaff publication. A technical discussion thereof is found in Brookhaven National Lab. Report BNL 17958 by the inventors herein.

In the embodiment shown in FIG. 3 the first and second layers 19 and 23 are uniform in thickness, in which case the even order reflections are absent. In the modification shown in FIG. 3a, the intensity of the higher odd orders can be minimized or reduced to zero by providing a sinusoidally varying scattering profile. As shown in FIG. 3a, the amount of the first and second metals increase and decrease oppositely in uniform gradients, such that in first alternate periodic planes there occur all one metal, in second alternate periodic planes there occur all the other metal, and mid-way in between the planes there occur parallel planes having equal amounts of each metal.

FIG. 4 shows a suitable apparatus for making the embodiments of FIG.'s 3 and 3a. To this end, the respective metals are continuously heated to vaporize them through shutters 25 and 27 that selectively open and close to coat a substrate 17 formed from a substantially non-neutron absorbing optical flat. By alternately periodically keeping shutter 25 closed and shutter 27 open and vice versa, first one flat, uniform thickness, amorphous layer 19 is applied, and then another flat, uniform thickness, parallel, amorphous layer 23 is applied, and the sequence repeats in cycles until both shutters are closed. By moving the shutters oppositely to open and shut the shutters in a continuing sequence, the layers are flat, uniform in thickness, parallel and have the described sinusoidally varying scattering profile on the flat substrate 17.

Figure 5:
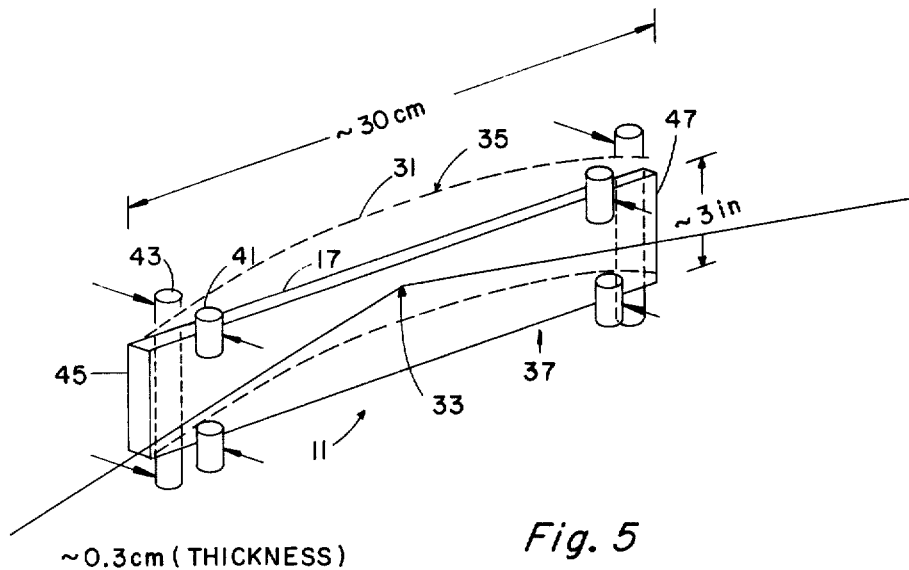
FIG. 5 is a partial three-dimensional view of another embodiment of the monochromator of FIG. 2.
Figure 5A:
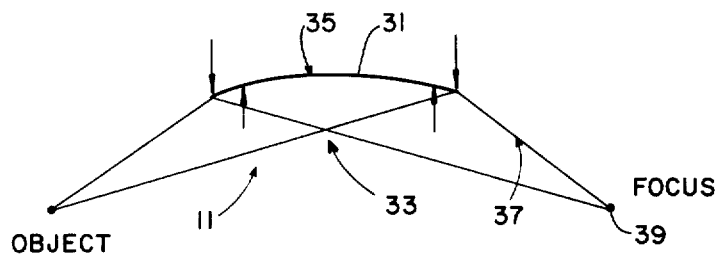
FIG. 5a is a schematic view of the focusing of the monochromator of FIG. 5.

In the modification shown in FIG. 5, the flat rectangular shaped substrate 17 having like layers 19 and 23 is formed as described above by the apparatus of FIG. 4, and they are bent to form a generally elliptically shaped dish 31 having in cross section, as shown in FIG. 5a, open and closed ends 33 and 35 formed by a convex side 37 facing the beam 13 for receiving and focusing the scattered neutrons from the crystal 11 toward a focal point 39. Fixed supports 41 hold the exposed side of the layers on one side of the crystal, and moveable means 43 oppositely bias the crystal ends 45 and 47 from the opposite exposed side of the substrate 17 to bend the crystal 11 by applying a double moment with unbalanced forces at the opposite ends of the monochromator.

FIG. 5b shows the increased intensity of the focused neutrons at point 39, compared to the unfocused neutrons.

The following are examples of the described monochromator:

EXAMPLE I

A plurality of multi-layers for use as monochromators were made with the apparatus illustrated in FIG. 4, to produce flat, parallel, alternate, periodic, at least 99 percent pure, Ge and Mn amorphous layers which were coated on a boron-free quartz substrate 1 cm × 4 cm by standard vacuum evaporation techniques. The Mn and Ge were readily available, lended themselves to vacuum evaporation in uniform thick layers uniformly coating the entire area of one side of the substrate and possessed suitable scattering characteristics with low neutron absorption cross-section and scattering lengths of $f' = -2.8$ Fermis for Mn and $f' = 3.7$ Fermis for Ge. Other metals can be used, for example tantalum can be substituted for the Mn, but only a few isotopes have a negative scattering length. The parameters of TABLE I were used.

EXAMPLE II

The steps of Example I were repeated to produce monochromators having 10 Mn — Ge bi-layers with unit spacings of $d = 120$ A and 191 A respectively, and scattering curves were made with the arrangement illustrated in FIG. 2, with neutrons from the Brookhaven National Laboratory HFBR that were transported through a beam pipe having a Be fitter and annular Cd slits for producing a neutron beam having a divergence angle $\alpha \sim 2°$ and a Maxwellian wavelength distribution from 0.5 to 20 A for detection from a graphite analyzer with a $He^3$ counter, having computer controlled movement around fixed and moveable pivot axes. The intensity of the output beams varied from $10^4$ to about $10^1$ for scattering angles from 0° – 4.8°, as shown in FIG. 1 of BNL Report 17958, with higher intensities being recorded for the Mn—Ge bilayers having a distance periodicity $d$ of 120 A for angles $\theta$ from about 0.8° to 4.8°. This invention is effective however, at angles $\theta$ up to at least 6°, as illustrated in Table I.

EXAMPLE III

The steps of Example II were repeated for the ten 191 A Mn—Ge bilayers to determine the input to output beam efficiencies for the crystals of this invention. The efficiencies increased from 10 to over 35 percent for scattered neutrons having wavelengths from 3.94 to 4.16 A at various angles $\theta$. No higher order peaks were observed, and the efficiencies were greater than with the ten 120 A bilayers due to the change in path length, which was dependent on $d$ and $\theta$. It is believed that increasing the number of bilayers increases the efficiencies to well over 60 percent.

EXAMPLE IV

The steps of Example III were repeated for providing wide wavelength band pass and narrow peak width for continuous wavelength X-ray and thermal neutron sources. It is believed that multilayers with reflectivities $\sim 1.0$ can be constructed. For a Ni—Al multilayer first order Bragg peak, $(\Delta\lambda/\lambda) \sim 0.1$, the reflectivity was 0.47, and $\Delta 0 \sim 0.8$ milliradians. Since the reflectivity and $\Delta\theta$ are related, it has been difficult to increase $\Delta\theta$ (effectively increasing $\Delta\lambda/\lambda$) very much with the artificial crystals of this example, while still keeping the reflectivity $\sim 0.5$. Multilayers with smaller repeat spacings, i.e., periodicity distances $d$ (larger $\theta_B$) can be fabricated, but for spacings less than 30 A, it is difficult to evaporate uniform thickness layers.

EXAMPLE V

The steps of Example III are repeated with the apparatus of FIG. 4 to produce 30–100 layer monochromators having $d$ thicknesses between 20–200 A of germanium and manganese with uniform density, alternating, flat, parallel layers as illustrated in FIG. 3. To this end, the shutters of FIG. 4 were alternately opened and closed. Like layers having a sinusoidally varying volumetric scattering densities were made by oppositely opening and closing the shutters of FIG. 4. Varying the incident angle $\alpha$ and the distance $d$ provides wavelength spread selection. If the bilayer is composed of equally thick layers, then even order reflections are absent. On the other hand, the higher order odd orders can be minimized or reduced to zero with the sinusoidally varying scattering profile of FIG. 3a.

EXAMPLE VI

The steps of Example IV are repeated with alternating Mn—Ge layers layers that are 100 A thick for selecting neutrons having wavelengths of about 4 A at an input and output scattering angle $\theta$ of about 1° with a narrow beam divergence of less than 2 times the input beam divergence.

EXAMPLE VII

The steps of Example VI are repeated using various optical fringe counting flats having flatnesses of 1–5 bands of Hg light, as determined by standard Do—All brand light flatness apparatus, and smoothnesses with peaks and valleys no greater than 10 A, as determined by standard $rms$ analysis. The thickness $d$ of Mn—Ge and Ta—Ge bi-layers is determined by standard quartz crystal oscillator rate monitor techniques employing the change in $rf$ transmission frequency in resonant crystal oscillator circuits to calibrate the desired vapor deposition rate and conditions. Weight measuring techniques are also useful for this purpose. One layer is applied in a continuously variable time of from approximately 30 seconds at $10^{-6}$ Torr. For example, $10^8$ monolayers are applied in 1 minute, $4 \times 10^8$ monolayers are applied in 4 minutes, $10^9$ monolayers are applied in 40 minutes and $10^{10}$ monolayers are applied in 400 minutes from 2–3 grams (at least 99 percent pure) of the respective metals heated in tungsten ribbon boats at 100 Amps in 10–15 seconds, e.g., to produce manganese temperatures of $1,100° \pm 200°C$ (or from $900°–1200°C$) and germanium temperatures of $1,400° \pm 200°C$ (or $1,200°–1600°C$).

EXAMPLE VIII

The steps of Example VII were repeated using at least 99 percent pure metals in the apparatus of FIG. 5. to bend the flat rectangular shaped substrate and crystal of FIG. 2 into the dish shaped substrate and crystal of FIG. 5a. To this end, while the crystal of FIG. 2 was mounted as shown, the crystal was bent into a generally elliptically shaped dish having open and closed ends defined by a convex side for receiving and focusing at a focal point an input beam having wavelengths between 0.5 and 20 A and a divergence of 2°. The crystal was bent by holding first spaced apart stationary support means spaced from the ends on the exposed side of the layers, and holding spaced apart biasing second means on the opposite exposed side of the substrate at the ends thereof ½ cm. beyond the first supports. Then a double moment was applied by biasing the first and second means relatively together to provide an unbalanced force at the opposite ends of the monochromator. This produced a 0.005 cm peak bend at the bottom of the closed end of the dish across a 10 inch long crystal that was 2–3 mm thick and 1 inch wide for focusing the scattered neutrons out the open end of the dish, as shown in FIG.'s 5a and 5b. In the latter figure, the lower curve shows the unfocused neutron intensity at the detector 15 (angle of 0.145°) over a computer controlled rotation of between about 120° – 150°, showing peak neutron intensity counts of 4,000 counts/half min. The upper curve, shows the focused neutron intensity of over 16,000 counts/half min. over a much smaller area.

This invention provides a monochromator having an artifical crystal that is tailored for efficiently selecting a narrow band of electromagnetic energy and quanta having short wavelengths. The crystal is tailored as to structure and composition by providing a specific non-neutron absorbing substrate, and a plurality of specific bilayers having different specific volumetric densities and scattering factors. Also, the bilayers have specific thicknesses and periodicity distances $d$ from 20°–200 A for selecting specific wavelengths of up to 10 A or more at specific low angles $\theta$, e.g., up to 6° or more. Additionally, the shape of the crystal is tailored to be flat or dished to provide a high intensity focused output beam, and the incident beam divergence angle $\alpha$ and the periodicity thickness distance $d$ of the layers are tailored to provide a selective spread.

TABLE I

| d in A | λ in A | θ | λ in A | θ |
|---|---|---|---|---|
| (artificial crystals) | | | | |
| 200 | 4 | ~½° | 10 | ~1.5° |
| 100 | 4 | ~1° | 10 | ~3.0 |
| 50 | 4 | ~2° | 10 | ~6.0° |
| (natural crystal) | | | | |
| 4 | 1 | ~38° | 10 | impossible |

TABLE II

| | vol. nucleon density | | | |
|---|---|---|---|---|
| | *b | f | $b_2f_2$** | $b_1f_1$** |
| germanium | +8.4 | 74 | | +62 |
| manganese | −3.7 | 130 | −48 | |
| | 12.1 | | | |

**$F = d/\pi n (b_1f_1 - b_2f_2)$
F = structure factor ($F^2$ α neutron intensity)
$n$ = number of layers
$d$ = thickness of layers
$b$ = neutron scattering factor in Fermi units
$f$ = volumetric nucleon density factor

What is claimed:

1. A monochromator for efficiently selecting a narrow band of neutron wavelengths from an input beam having a Maxwellian wavelength distribution of neutrons comprising:
   a. a flat substrate;
   b. a plurality of parallel, flat, uniform, selectively tailored thickness, amorphous germanium layers uniformly deposited over the entire surface of said substrate; and
   c. a plurality of amorphous layers that alternate periodically with said germanium layers, are interposed therebetween to form bilayers and are parallel therewith selected from the group consisting of tantulum and mangenese having a selectively tailored thickness.

2. The monochromator of claim 1 in which the layers are germanium and manganese layers between 20 and 200 A thick.

3. The monochromator of claim 2 in which said layers are about 100 A thick for selecting neutrons having a wavelength of about 4 A at an input and output angle $\theta$ of about 1°.

4. The monochromator of claim 3 in which there are 10 of the bi-layers which are at least 99 percent pure, on a boron-free quartz substrate.

5. The monochromator of claim 4 in which the layers have a sinusoidally varying volumetric scattering density.

6. The monochromator of claim 5 in which said substrate and layers form in cross-section a generally elliptically shaped dish having open and closed ends defined by a convex side for receiving and focusing at a focal point an input beam having wavelengths between 0.5 and 20 A and a divergence of 2°.

7. The monochromator of claim 6 having first stationary support means on the exposed side of said layers, and biasing means on the opposite exposed side of said substrate for applying a double moment with unbalanced forces at the opposite ends of the monochromator for producing the generally ellipticall shaped dish from a flat rectanglar shaped substrate.

8. The method of making a monochrometer for efficiently selecting a narrow band of neutron wavelengths from an input beam having a Maxwellian wavelength distribution of neutrons, comprising the steps of:
   a. respectively filling first and second boats with different amorphous metals having different volumetric nuclear densities $f$ and radiation scattering factors $b$, and having purities of at least 99.0 percent;
   b. heating the respective metals so as to produce evaporation thereof in the form of first and second vapors; and
   c. depositing said first and second vapors on an optical flat in alternate periodic layers.

9. The method of claim 8 in which said different amorphous metals consist of germanium and manganese for producing alternate periodic layers of germanium and manganese on said optical flat.

10. The method of claim 9 in which said boats are arranged side by side in an evacuated chamber below said optical flat with first and second respective shutters interposed between said respective first and second boats and said optical flat, and said shutters are sequentially alternately opened and closed oppositely for depositing said alternate periodic layers with sinusoidally varying volumetric neutron scattering densities.

* * * * *